Dec. 31, 1940.  H. KÜPPENBENDER  2,226,618
READING AND COPYING DEVICE
Filed Aug. 4, 1939    4 Sheets-Sheet 1

Inventor:
Heinz Küppenbender
By:
Singer, Ehlert, Stern & Carlberg
Attys.

Dec. 31, 1940.  H. KÜPPENBENDER  2,226,618
READING AND COPYING DEVICE
Filed Aug. 4, 1939    4 Sheets-Sheet 3

Inventor:
Heinz Küppenbender
BY:
Singer, Ehlert, Stern & Carlberg
Attys.

Dec. 31, 1940.   H. KÜPPENBENDER   2,226,618
READING AND COPYING DEVICE
Filed Aug. 4, 1939   4 Sheets-Sheet 4
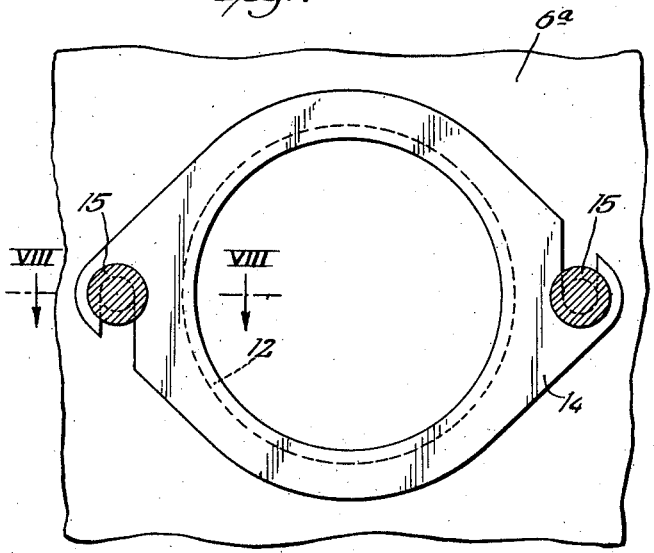
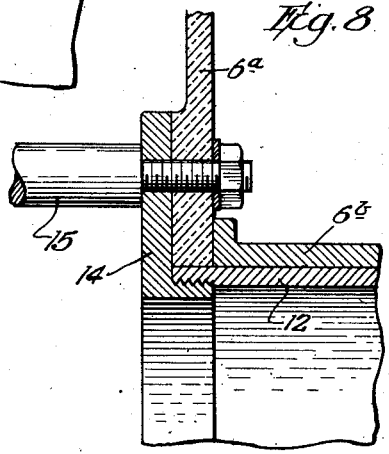
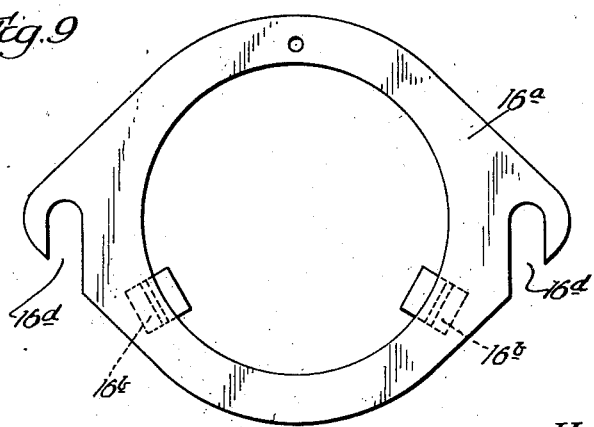
Inventor:
Heinz Küppenbender
By:
Singer, Ehlert, Stern & Carlberg
Attys.

Patented Dec. 31, 1940

2,226,618

UNITED STATES PATENT OFFICE 2,226,618

READING AND COPYING DEVICE

Heinz Küppenbender, Dresden, Germany, assignor to Zeiss Ikon Aktiengesellschaft, Dresden, Germany Application August 4, 1939, Serial No. 288,468
In Germany August 13, 1938

10 Claims. (Cl. 88—24)

The invention relates to improvements in reading and copying devices in which pictures, documents and reading matter recorded on motion picture films or the like are projected onto a screen in an enlarged scale.

Of late, it has become customary to record pictures, documents, and reading matters of all kinds, as for instance extracts from rare books, etc. on small film strips, as for instance on motion picture films. In order to view or reproduce the recorded matter, it is advisable to project the films so that the pictures, documents, and reading matter are reproduced in an enlarged scale.

It is now the principal object of the present invention to provide a device in which the pictures, reading matter etc. recorded on film strips can be projected in an enlarged scale for convenient viewing or for photographic printing.

Another object of the invention is to provide a reading and copying device of the character described, in which an illumination device is mounted on the underside of a horizontal supporting plate, on the upper side of which is mounted a projection chamber having a viewing screen on which the enlarged image of the projected film appears.

According to another object of the invention a film carrier mount and a projection objective are mounted between the illuminating device and the projection chamber and above the top face of the supporting plate for convenient manipulation.

It is also an object of the invention to mount the entire reading and copying device as a unit upon a table, a wheeled supporting frame, or on a wall in such manner that the viewing screen will be in eye level height.

Other objects of the invention will be apparent or will be specifically pointed out in the description forming a part of this specification. The invention, however, is not limited to the embodiment described, as various forms may be adopted within the scope of the claims.

Referring to the drawings:

Fig. 7 is an enlarged sectional view along the line VII—VII of Fig. 1.

Fig. 8 is a sectional view along the line VIII—VIII of Fig. 7.

Fig. 9 is a plan view of the holder for the mirror reflector along the line IX—IX of Fig. 1, and Fig. 10 illustrates in an enlarged sectional view the clamping device for a modified viewing screen.

Figure 1:
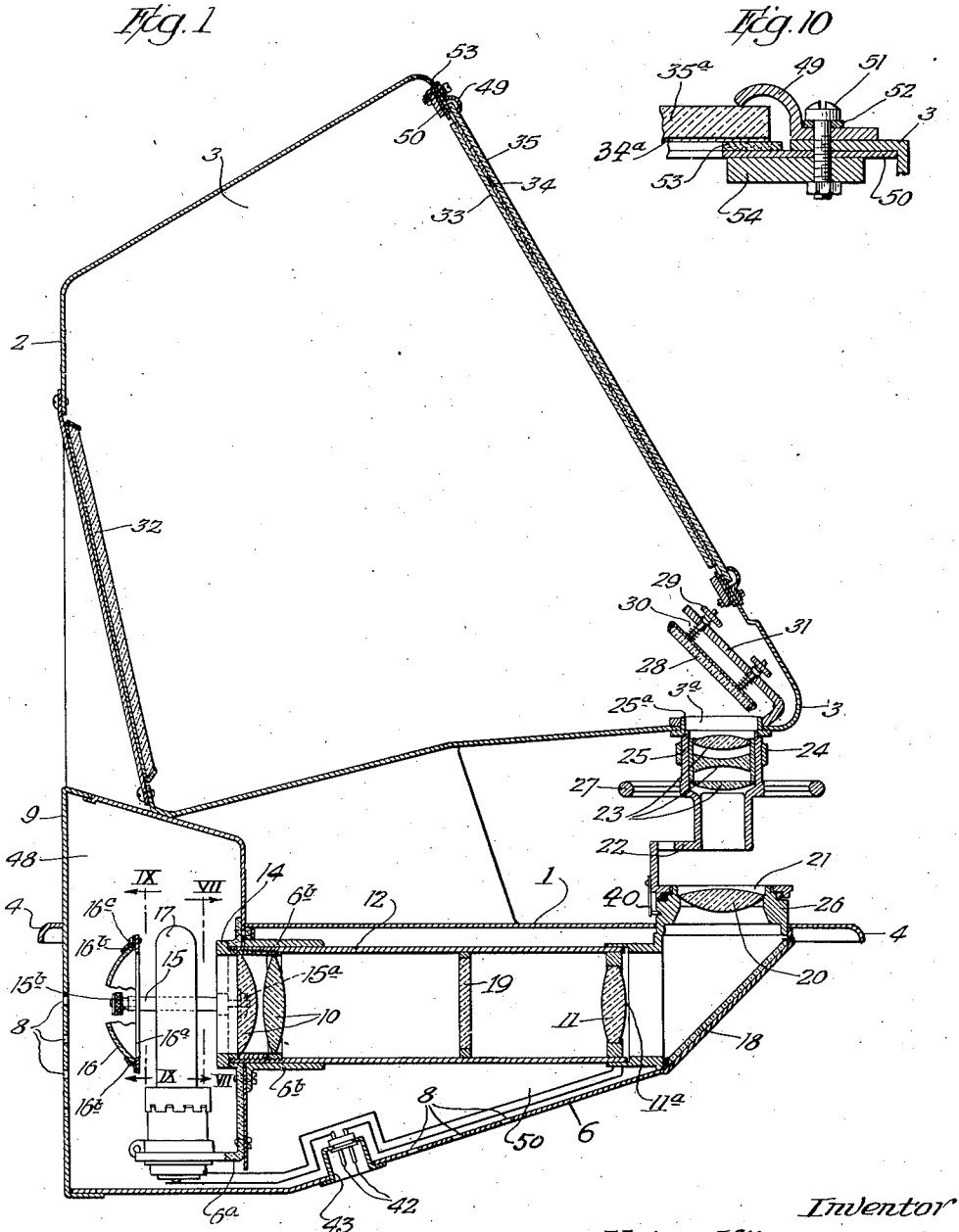
Figure 1 illustrates diagrammatically a vertical section of the device of the invention, substantially along the line I—I in Fig. 2.
Figure 2:
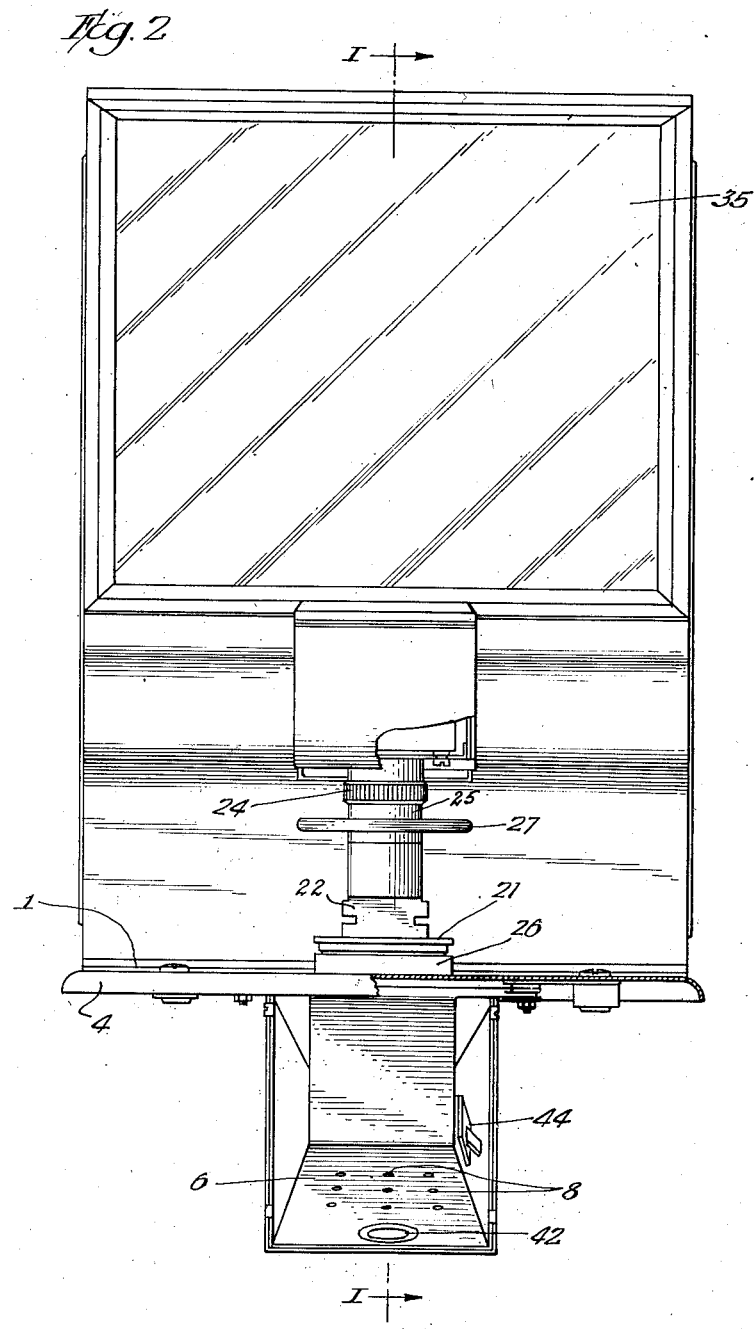
Figure 2 is a diagrammatic front view of the device.
Figure 3:
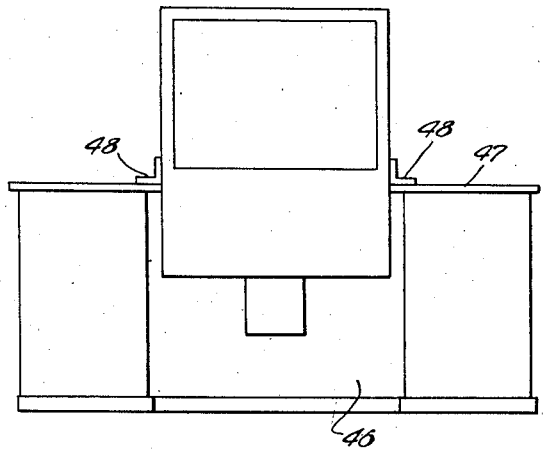
Figures 3 and 4 illustrate diagrammatically in front and side view respectively, the mounting of the device of the invention on a desk.
Figure 4:
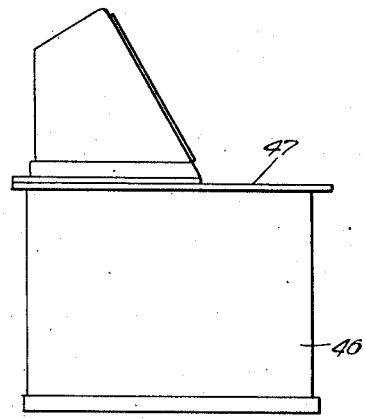

The device of the invention is provided with a horizontal supporting plate 1, on the upper face of which is mounted a closed dust-proof casing 2, the interior of which forms the projection chamber 3 of the device. A closed casing 6 containing the illuminating device is mounted on the lower face of the plate 1. The shape of the casings 2 and 6 is such as to enclose the entire path of the projection light beam.

The casing 6 containing the illuminating device is provided with ventilating apertures 8. A cover 9 is hinged to the rear end of the casing 6 or is entirely removable therefrom. The illuminating device comprises a concave mirror 16, a lamp 17, a condenser lens system 10, a collective lens 11 and a tubular member 12 in which the condenser lens system 10 and the collective lens 11 are mounted. The tubular member 12 is detachably secured in a partition wall 6ª of heat insulating material which has a sleeve 6ᵇ attached thereto for slidably guiding the member 12 when it is inserted in the casing 6. The wall 6ª is rigidly mounted in the casing 6 and divides the latter into a lamp chamber 48 and a lens chamber 50. The end of the tubular member 12 next to the lamp 17 is provided with a bayonet lock 14, which engages two supporting bolts 15. The bolts 15 are fixedly attached to the partition wall 6ª and in turn have the concave mirror 16 in the lamp chamber 48 attached thereto. With reference to Figs. 1 and 9 it will be noted that the concave mirror 16 is mounted on a ring-shaped holder 16ª provided with three holding lugs 16ᵇ, at least one of which is detachably secured to the holder 16ª by a screw 16ᶜ. The holder 16ª is provided with two slots 16ᵈ adapted to receive the reduced and threaded rear ends of the bolts 15 and is secured to the latter by thumb nuts 15ᵇ.

The light rays passing through the tubular member 12 are reflected by a mirror 18 upwardly through a second condenser lens 20 into the picture window 21, arranged in a gate 22 adapted to receive interchangeable carriers for the films. The carriers may be of different structure, depending upon whether film strips, cut films or slides are to be projected.

After the light rays have been passed through the picture at the picture window 21, they pass through an interchangeable projection objective 23 having an adjustable diaphragm. The objective 23 by means of an adjusting ring 24 is adjustable in its mount 25. The adjusting ring 24 is arranged closely adjacent and below the bottom wall of the casing 2 forming the projection chamber 3, so that during the operation of the device, particularly during a change of a picture, an accidental change in the adjustment of the projection objective 23 is prevented.

The gate 22 with the picture window 21 and the objective 23 are rotatably supported as a unit by a ball bearing structure 26 mounted on the upper face of the plate 1 so as to be adjustable to positions in which the pictures appear on the viewing screen selectively with their long side horizontal or vertical. A catch 40 is provided for securing the rotatable gate 22 and objective 23 in the selected position. A hand wheel 27 is attached to the gate 22 just below the objective 23 for permitting a convenient rotation of these combined parts into the desired position.

The objective 23 projects an image of the picture through an opening 3ª in the bottom wall of the projection chamber 3 onto a mirror 28 within the projection chamber 3. The mirror 28 is adjustably mounted on a plate 31 by means of screws 29 and springs 30. The plate 31 is rigidly connected with an annular member 25ª fixed to the bottom wall of the casing 2 for rotatably guiding the upper end of the tubular mount 25 of the projection objective 23. The mirror 28 reflects the image to a mirror 32 mounted on the rear wall of the projection chamber from which the image is reflected onto the viewing screen 33, 34, 35 in the front wall of projection chamber 3 and arranged preferably in eye level height.

In the embodiment of the invention as shown in Fig. 1 the viewing screen consists of two clear glass plates 33 and 35 between which is mounted a fine-grain translucent sheet of paper 34. The viewing screen may also consist of a single clear glass plate 35ª (Fig. 10) to which a fine-grain translucent sheet of paper 34ª is cemented. A viewing screen made from fine-grain translucent paper has the advantage of a greater dispersion when compared with an ordinary ground glass plate, so that no pronounced light and dark spots appear on the viewing screen. According to Fig. 10 the viewing screen 34ª, 35ª is held in position by a clamping bar 49 and a frame 50, the latter of which lies against the inner face of the wall of the casing 3 and is reinforced by a bar 54. A felt or leather strip 53 prevents a breaking of the screen when the screws 51, provided with washers 52, are tightened to draw the bars 49 and 54 together.

In order to prevent an excessive heating of the mirror 18 and any other optical member the path of the light rays, including the film or picture to be projected, there is mounted preferably in the tubular member 12 a protective heat filter 19 consisting of a light transmitting heat absorbing material, for instance ferro-oxide glass. Preferably, the lens 11 is provided with a frosted face 11ª to enhance the uniformity of the illumination.

An electric plug 42 adapted to be connected with a source of current is mounted in a cup-shape mount 43 inserted in the bottom wall of the casing 6. Conductors lead from this plug 42 to the lamp 17 and also to a manually controllable switch 44 on one of the side walls of the casing 6. If desired, the switch 44 may be mounted for more convenient access on the supporting plate 1.

If it is desired to make the projected images visible to a larger number of persons, then it is advisable to make the mirror 32 including that portion of the wall of the casing 2 to which the mirror 32 is attached, removable or tiltable. The projected image can then be projected outwardly through the aperture formed by the removal of the mirror 32 and onto a screen of large size.

In order to employ the device of the invention for making enlarged copies or prints of a film, the viewing screen 33, 34, 35 is replaced by a clear glass plate provided with holding means for securing a translucent sheet of paper, which is used for focusing, or a photosensitive printing paper in place. The glass plate may also be provided with adjustable masking bands for producing prints of any desired size. It is also possible to replace the clear glass plate by a printing frame, whose light receiving opening faces the interior of the projection chamber 3.

The two side edges and the upper edge of the front wall of the casing 2 have each hingedly attached thereto a wing-like plate 36, 37 and 38 respectively, which form in their erected operative position a hood around the viewing screen to keep side light away from the same when viewing the image. In their inoperative position the plates 36, 37 and 38 are folded upon the viewing screen so as to form a protective cover for the same. The side plates 36 and 37 are inclined outwardly in their operative position as may be noticed from Fig. 5, so that a number of persons simultaneously may view the image on the screen.

Since a different illumination is necessary when viewing negative or positive pictures, the device of the present invention is provided with means for inserting into the path of light between the lamp 17 and the mirror 28 light dampening elements or elements which influence the color of light. These elements may consist of diaphragms, gray filters or color filters.

Figure 5:
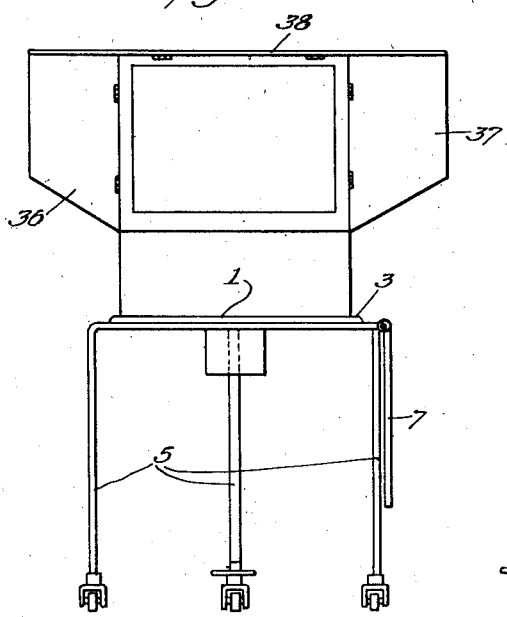
Figures 5 and 6 illustrate diagrammatically in front and side view the mounting of the device of the invention on a wheeled supporting frame.
Figure 6:
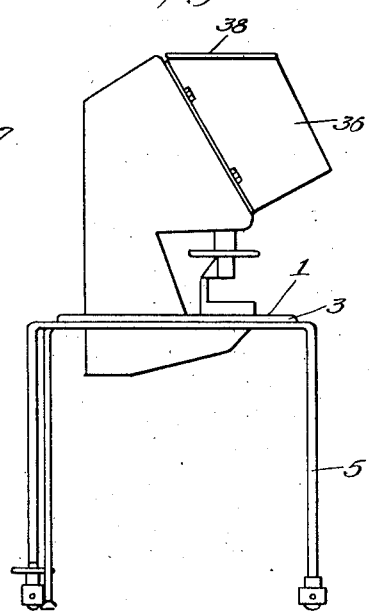

The marginal portion 4 of the supporting plate 1 projects beyond the outline of the upper casing 2 and is used for securing the reading and copying device to a readily movable supporting frame 5 (Figs. 5 and 6). The frame 5 is provided with a foldable plate 7, which in its operative horizontal position serves as a table surface approximately in the same level as the supporting plate 1.

The reading and copying device of the invention may also be mounted on any desk, for instance a writing desk 46. In such case the table top 47 of the desk 46 is provided with an aperture of the size of the supporting plate 1 and the reading and copying device is provided on both sides with angle-iron bars 48 or the like, which rest upon the edges of the aperture, thus supporting the entire device in the desired height with respect to the viewer.

The reading and copying device may also be supported on a wall, in which case the bars 48 rest upon brackets projecting from the wall, or the rear wall of the casing 2 may be provided with loops or the like adapted to suspend the entire device from nails, hooks or the like on the wall.

If desired the supporting plate 1 may have attached thereto short legs or other supporting members which are somewhat longer as the height of the lower casing 6, so that the entire device may be set upon a low table top or the like.

What I claim is:

1. A reading and copying device comprising a horizontal supporting plate provided with an aperture, a closed projection chamber mounted on the upper face of said supporting plate, said projection chamber having a front wall, a rear wall, a top wall and a bottom wall, the latter being spaced from said supporting plate, a gate for receiving a film to be projected, an annular member mounted in said aperture of said supporting plate for supporting said gate, a projection objective arranged above said gate and extending through the bottom wall of said projection chamber near the front wall thereof, an illuminating device mounted on the lower face of said supporting plate and including a casing provided with a source of light and means for reflecting rays from said source of light upwardly through said annular member in said supporting plate and through said gate and projection objective into said projection chamber, and means within said projection chamber for reflecting the image projected by said objective in an enlarged size upon said front wall of said projection chamber, said means including an adjustable mirror in the path of the rays passing through said objective and in a position to reflect the rays toward said rear wall of said projection chamber, a mirror on said rear wall and positioned to reflect the rays toward said front wall, said front wall being provided with an aperture and means for detachably securing in said aperture a translucent screen for viewing the projected picture.

2. A reading and copying device comprising a horizontal supporting plate provided with an aperture, a closed projection chamber mounted on the upper face of said supporting plate, said projection chamber having a front wall, a rear wall, a top wall and a bottom wall, the latter being spaced from said supporting plate, a gate for receiving a film to be projected, an annular member mounted in said aperture of said supporting plate for supporting said gate, a projection objective arranged above said gate and extending through the bottom wall of said projection chamber near the front wall thereof, an illuminating device mounted on the lower face of said supporting plate and including a casing provided with a source of light and means for reflecting rays from said source of light upwardly through said annular member in said supporting plate and through said gate and projection objective into said projection chamber, and means within said projection chamber for reflecting the image projected by said objective in an enlarged size upon said front wall of said projection chamber, said means including an adjustable mirror in the path of the rays passing through said objective and in a position to reflect the rays toward said rear wall of said projection chamber, a mirror on said rear wall and positioned to reflect the rays toward said front wall, said front wall being provided with a clear glass plate and means for clamping thereon a photosensitive printing paper.

3. A reading and copying device comprising a horizontal supporting plate provided with an aperture, a closed projection chamber mounted on the upper face of said supporting plate, said projection chamber having a front wall, a rear wall, a top wall and a bottom wall, the latter being spaced from said supporting plate, a gate for receiving a film to be projected, an annular member mounted in said aperture of said supporting plate for supporting said gate, a projection objective arranged above said gate and extending through the bottom wall of said projection chamber near the front wall thereof, an illuminating device mounted on the lower face of said supporting plate and including a casing provided with a source of light and means for reflecting rays from said source of light upwardly through said annular member in said supporting plate and through said gate and projection objective into said projection chamber, and means within said projection chamber for reflecting the image projected by said objective in an enlarged size upon said front wall of said projection chamber, said means including an adjustable mirror in the path of the rays passing through said objective and in a position to reflect the rays toward said removable rear wall of said projection chamber, a mirror on said removable rear wall and positioned to reflect the rays toward said front wall, said front wall being provided with a translucent screen for viewing the projected picture, said adjustable mirror being adapted upon removal of said rear wall and the mirror thereon to project the image outwardly of the projection chamber upon a screen placed in the path of the light reflected by said adjustable mirror.

4. A reading and copying device comprising a horizontal supporting plate provided with an aperture, a closed projection chamber mounted on the upper face of said supporting plate, said projection chamber having a front wall, a rear wall, a top wall and a bottom wall, the latter being spaced from said supporting plate, a gate for receiving a film to be projected, an annular member mounted in said aperture of said supporting plate for supporting said gate, a projection objective arranged above said gate and extending through the bottom wall of said projection chamber near the front wall thereof, an illuminating device mounted on the lower face of said supporting plate and including a casing provided with a source of light and means for reflecting rays from said source of light upwardly through said annular member in said supporting plate and through said gate and projection objective into said projection chamber, and a condenser and a collective lens mounted between said source of light and said reflecting means, said collective lens being positioned adjacent said reflecting means and the face of the collective lens facing said reflecting means being frosted so as to diffuse the light reaching said reflecting means from said source of light.

5. A reading and copying device comprising a horizontal supporting plate provided with an aperture, a closed projection chamber mounted on the upper face of said supporting plate, said projection chamber having a front wall, a rear wall, a top wall and a bottom wall, the latter being spaced from said supporting plate, a gate for receiving a film to be projected, an annular member mounted in said aperture of said supporting plate for supporting said gate, a projection objective arranged above said gate and extending through the bottom wall of said projection chamber near the front wall thereof, an illuminating device mounted on the lower face of said supporting plate and including a casing provided with a source of light and means for reflecting rays from said source of light upwardly through said annular member in said supporting plate and through said gate and projection objective into said projection chamber, and a tubular member containing in axially spaced relation a condenser and a collective lens, said tubular member being detachably mounted in said casing so as to support said condenser and collective lens in axial alined position between said source of light and said reflecting means.

6. A reading and copying device comprising a horizontal supporting plate provided with an aperture, a closed projection chamber mounted on the upper face of said supporting plate, said projection chamber having a front wall, a rear wall, a top wall and a bottom wall, the latter being spaced from said supporting plate, a gate for receiving a film to be projected, an annular member mounted in said aperture of said supporting plate for supporting said gate, a projection objective arranged above said gate and extending through the bottom wall of said projection chamber near the front wall thereof, an illuminating device mounted on the lower face of said supporting plate and including a casing provided with a source of light, means for reflecting rays from said source of light upwardly through said annular member in said supporting plate and through said gate and projection objective into said projection chamber, a tubular member containing in axially spaced relation a condenser and a collective lens mounted between said source of light and said reflecting means, and a partition of heat insulating material in said casing adjacent said lamp, said tubular member being detachable secured to said partition.

7. A reading and copying device comprising a horizontal supporting plate provided with an aperture, a closed projection chamber mounted on the upper face of said supporting plate, said projection chamber having a front wall, a rear wall, a top wall and a bottom wall, the latter being spaced from said supporting plate, a gate for receiving a film to be projected, an annular member mounted in said aperture of said supporting plate for supporting said gate, a projection objective arranged above said gate and extending through the bottom wall of said projection chamber near the front wall thereof, an illuminating device mounted on the lower face of said supporting plate and including a casing provided with a source of light, means for reflecting rays from said source of light upwardly through annular member in said suporting plate and through said gate and projection objective into said projection chamber, and a tubular member mounted detachably between said source of light and said reflecting means, said tubular member having mounted in that end which is nearest said source of light a condenser lens system and in the other end a collective lens, the casing of said illuminating device being provided with walls having ventilating apertures therein.

8. A reading and copying device comprising a horizontal supporting plate provided with an aperture, a closed projection chamber mounted on the upper face of said supporting plate, said projection chamber having a front wall, a rear wall, a top wall and a bottom wall, the latter being spaced from said supporting plate, a gate for receiving a film to be projected, an annular member mounted in said aperture of said supporting plate for supporting said gate, a projection objective arranged above said gate and extending through the bottom wall of said projection chamber near the front wall thereof, an illuminating device mounted on the lower face of said supporting plate and including a casing provided with a source of light, means for reflecting rays from said source of light upwardly through said annular member in said supporting plate and through said gate and projection objective into said projection chamber, and a tubular member mounted detachably between said source of light and said reflecting means, said tubular member having mounted therein in axially spaced relation a condenser lens system, a heat-absorbing light transmitting filter and a collective lens, the condenser lens system being mounted in that end of the tubular member which is nearest to said source of light.

9. A reading and copying device comprising a horizontal supporting plate provided with an aperture, a closed projection chamber mounted on the upper face of said supporting plate, said projection chamber having a front wall, a rear wall, a top wall and a bottom wall, the latter being spaced from said supporting plate, a gate for receiving a film to be projected, an annular member mounted in said aperture of said supporting plate for supporting said gate, a projection objective arranged above said gate and extending through the bottom wall of said projection chamber near the front wall thereof, an illuminating device mounted on the lower face of said supporting plate and including a casing provided with a source of light and means for reflecting rays from said source of light upwardly through said annular member in said supporting plate and through said gate and projection objective into said projection chamber, means within said projection chamber for reflecting the image projected by said objective in an enlarged size upon a wall of said projection chamber, and selectively operable light dampening means in the path of the light rays between said source of light and said reflecting means within said projection chamber.

10. A reading and copying device comprising a horizontal supporting plate provided with an aperture, a closed projection chamber mounted on the upper face of said supporting plate, said projection chamber having a front wall, a rear wall, a top wall and a bottom wall, the latter being spaced from said supporting plate, a rotatable gate for receiving a film to be projected, an annular member mounted in said aperture of said supporting plate for supporting said gate, a projection objective arranged above said rotatable gate and fixedly connected with the same, said objective extending through the bottom wall of said projection chamber near the front wall thereof, means for releasably locking said rotatable gate and objective in predetermined positions with respect to said annular supporting member, an illuminating device mounted on the lower face of said supporting plate and including a casing provided with a source of light and means for reflecting rays from said source of light upwardly through said annular member in said supporting plate and through said gate and projection objective into said projection chamber, and means within said projection chamber for reflecting the image projected by said objective in an enlarged size upon a wall of said projection chamber.

HEINZ KÜPPENBENDER.